United States Patent [19]

Luallin et al.

[11] Patent Number: 4,974,123
[45] Date of Patent: Nov. 27, 1990

[54] HEADLAMP ASSEMBLY

[75] Inventors: John M. Luallin; William E. Nagengast, both of Anderson, Ind.

[73] Assignee: General Motors Corporation, Detroit, Mich.

[21] Appl. No.: 407,001

[22] Filed: Sep. 14, 1989

[51] Int. Cl.$^5$ .............................................. B60Q 1/06
[52] U.S. Cl. ..................................... 362/66; 362/289; 362/421; 403/141; 403/143
[58] Field of Search ............... 362/66, 287, 289, 418, 362/419, 421; 403/141, 143, 289, 290, 344

[56] References Cited

U.S. PATENT DOCUMENTS

| | | | |
|---|---|---|---|
| 683,049 | 9/1901 | Johnston | 403/141 |
| 1,502,265 | 7/1924 | Paterson | 403/141 |
| 2,260,442 | 10/1941 | Dollase | 403/141 |
| 3,375,044 | 3/1968 | Peterson | 403/143 |
| 4,192,026 | 3/1980 | Williams | 403/289 |
| 4,689,725 | 8/1987 | Saijo et al. | 362/66 |
| 4,701,064 | 10/1987 | Mizusawa | 403/141 |
| 4,778,196 | 10/1988 | Spoliansky | 403/143 |
| 4,845,598 | 7/1989 | Watanabe et al. | 362/418 |
| 4,884,174 | 11/1989 | Dorleans | 362/421 |
| 4,894,754 | 1/1990 | Levilain | 362/421 |

Primary Examiner—Ira S. Lazarus
Assistant Examiner—Richard R. Cole
Attorney, Agent, or Firm—Edward J. Biskup

[57] ABSTRACT

A vehicle headlamp assembly having a lamp unit supported by three ball pivots each of which is connected to the reflector member of the lamp unit through a pair of socket portions which encapsulate the ball portion of the associated ball pivot and are connected together by a fastener accessible from above the headlamp assembly and which, when removed, allows the lamp unit to be released from the vehicle.

5 Claims, 2 Drawing Sheets

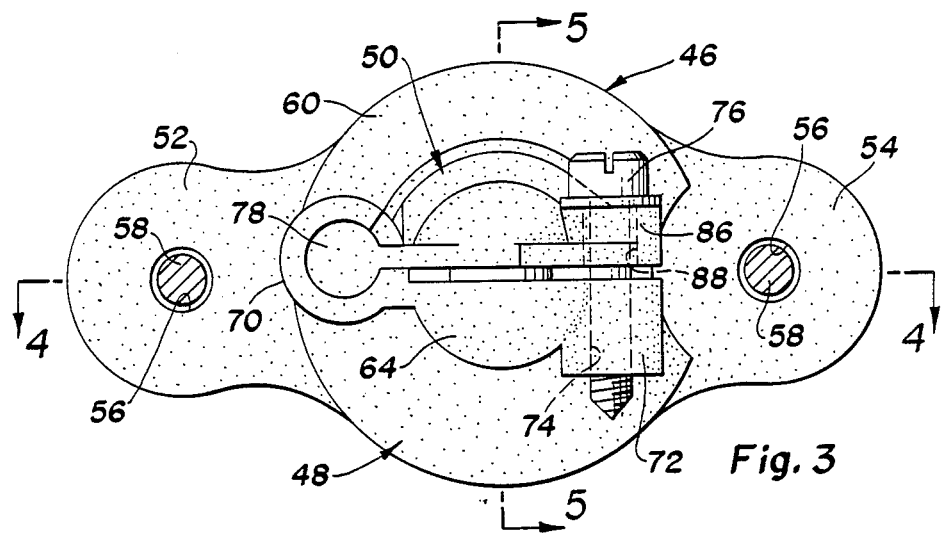
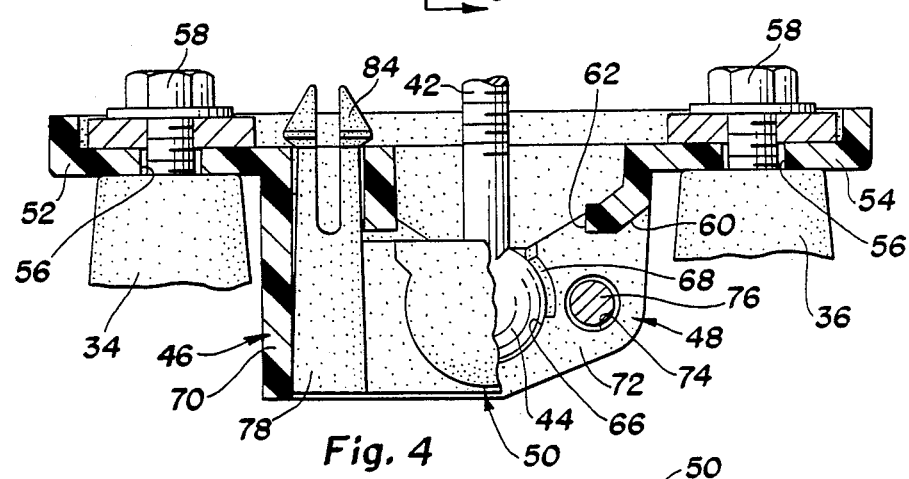
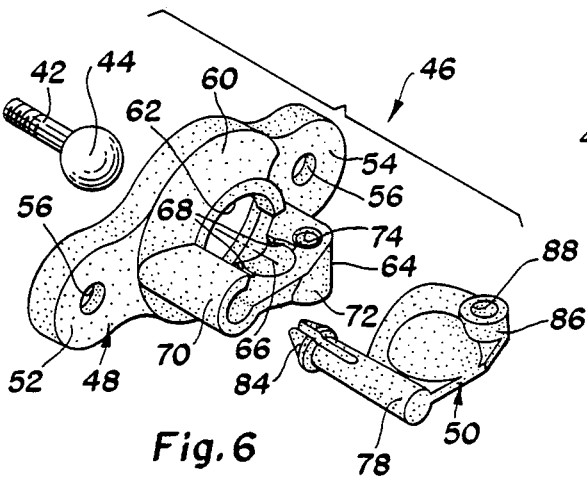
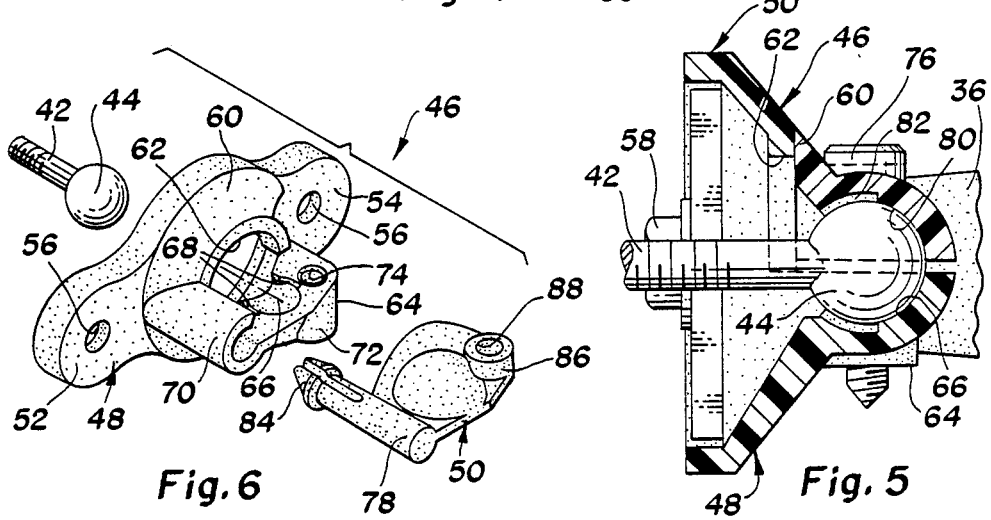

HEADLAMP ASSEMBLY

This invention concerns vehicle headlamps and more particularly relates to a headlamp assembly which is connected to a support panel by a plurality of ball pivots which allow relative adjustable movement of the lamp body about a horizontal aim axis and a vertical aim axis and are quickly releasable for removing the lamp body from the vehicle.

More specifically, the headlamp assembly according to the present invention is adapted to be mounted to a support panel at the front end of a motor vehicle through a plurality of ball pivots for selective adjustable movement of the lamp body for aiming purposes. The lamp body includes a reflector member the front end of which is closed by a lens and bearing means are provided for connecting each of the ball pivots to the rear of the reflector member. At least one of the bearing means comprises a first socket portion and a second socket portion which together provide a spherical bearing surface for receiving an associated ball pivot with the first socket portion having means for securing the bearing means to the reflector member. In addition, hinge means are provided for connecting the first socket portion to the second socket portion and a screw, which is accessible from above the headlamp, serves to secure the two socket portions together and also serves to release the socket portions from the ball pivot so that the lamp body can be removed from the vehicle.

The objects of the present invention are to provide a new and improved headlamp assembly having a lamp unit that is removably attached to a pair of longitudinally adjustable ball pivots and also to a fixed ball pivot so as to facilitate replacement of the lamp unit; to provide a new and improved vehicle headlamp assembly having a lamp unit supported by three ball pivots each of which is connected to the reflector member of the lamp unit through a pair of socket portions which encapsulate the ball portion of the associated ball pivot and are connected together by a fastener which when removed allows the lamp unit to be released from the vehicle; and to provide a new and improved headlamp assembly having a lamp unit attached through a ball pivot to a support panel and in which the ball pivot is connected to the reflector member of the lamp unit by a split bearing member having a pair of socket portions that are pivotally interconnected and are held in firm engagement with the ball pivot by screw means which can be removed for allowing the lamp unit to be separated from the support panel.

Other objects and advantages of the present invention will be apparent from the following detailed description of the invention when taken with the drawings in which FIG. 1 is an elevational view of the vehicle headlamp assembly made according to the present invention;

FIG. 3 is an enlarged sectional view taken on line 3—3 of FIG. 2 of one of the bearing members connecting a ball pivot to the lamp unit of the headlamp assembly;

FIG. 4 is a sectional view of the bearing member taken on line 4—4 of FIG. 3;

FIG. 5 is a sectional view of the bearing member taken on line 5—5 of FIG. 3; and FIG. 6 is an exploded perspective view of the bearing member of FIGS. 3 through 5.

Figure 1:
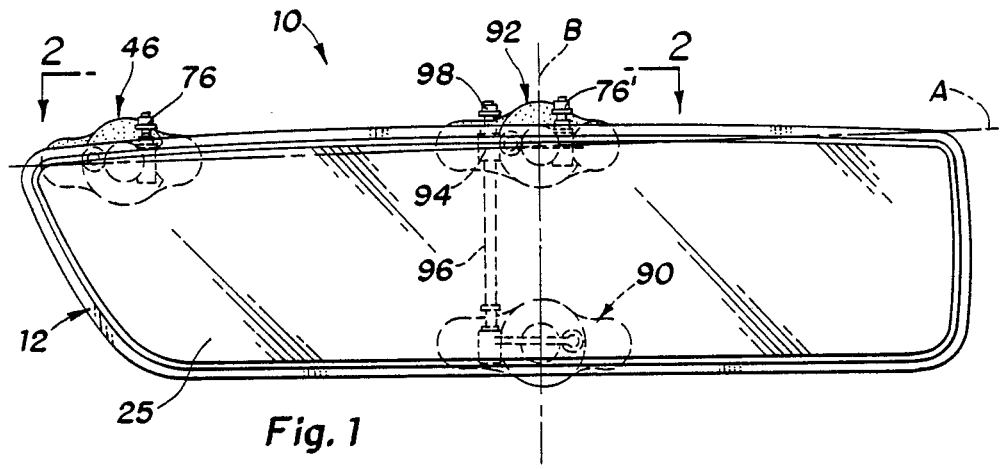
Figure 2:
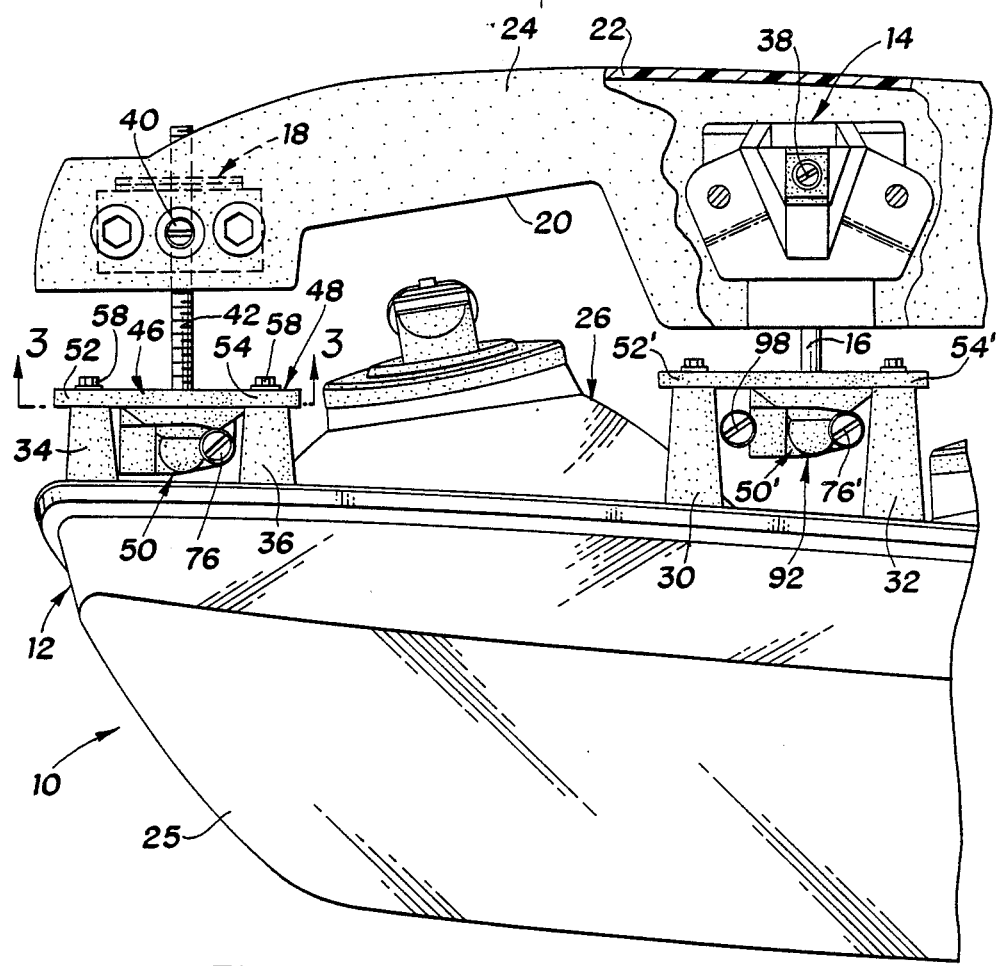
FIG. 2 is an enlarged plan view of a portion of the headlamp assembly taken on line 2—2 of FIG. 1.

Referring now to the drawings and more particularly FIGS. 1 and 2 thereof, a headlamp assembly 10 is shown of the replaceable light bulb composite type made according to the present invention. The headlamp assembly 10 includes a lamp body 12, a center pivot bracket 14 supporting a fixed ball pivot member 16 and combined with an adjustment mechanism (not shown) for lamp positioning about a horizontal aim axis A, and an adjustment mechanism 18 for lamp positioning about a vertical aim axis B. The headlamp assembly 10 is normally shipped as a unit to a vehicle manufacturer and thereafter is mounted to a support panel 20 at the front end of a motor vehicle so as to permit selective adjustable movement of the lamp body 12 in a horizontal plane containing the horizontal aim axis A and the vertical plane containing the vertical aim axis B.

The support panel 20 in this case is made of a plastic material and is fastened to the sheet metal structure (not shown) at the front portion of the motor vehicle. The support includes a back wall 22 integral with a pair of vertically spaced generally horizontal top wall 24 and a bottom wall (not shown) to which are fastened the bracket 14 and adjustment mechanism 18 which together mount the headlamp assembly 10 to the support panel 20 and also serve to reposition the lamp body 12 about the aforementioned vertical aim axis B and the horizontal aim axis A.

The lamp body 12 includes a plastic reflector member 26 formed with a pair of side-by-side parabolic cavities the inner concave surface of each of which is aluminized. Also, each of the parabolic cavities is provided with a single filament replaceable bulb 27 located so as to cause the associated aluminized parabolic concave surface to project a light beam forwardly of the vehicle. The light bulb in one of the cavities is provided with a filament located so as to allow the associated parabolic surface to project the so-called low beam when energized while the light bulb in the other cavity projects the so-called high beam when the filament thereof is energized. Thus, the lamp body 12 is actually two separate headlamps, a low beam unit and a high beam unit, joined together so as to facilitate the aiming adjustment of both lamps.

The front of the reflector member 26 is closed by a glass or like-material lens 25 the rear marginal portion of which is sealingly received by a channel provided around the entire margin of the front portion of the reflector member 26. At a point located between the cavities and adjacent the upper margin and lower margin of the reflector member 26 and integrally formed therewith are a pair of laterally spaced bosses 30 and 32 which extend rearwardly from the reflector member 26 A pair ©f similar bosses 34 and 36 are integrally formed, as seen in FIG. 2, at the left hand upper corner of the reflector member 26.

The bracket 14 as well as the two adjustment mechanisms for positioning the lamp body 12 about the horizontal aim axis A and the vertical aim axis B are essentially identical to the corresponding components as seen in U.S. Pat. No. 4,742,435 entitled "Support Arrangement for a Vehicle Headlamp" in the name of Van Duyn et al and issued on May 3, 1988. Accordingly reference is made to that patent for a detailed description of the construction of each of the adjustment mechanisms and the bracket 14. For present purposes, however, it should suffice to mention that, when a screwdriver or like is applied to the head 38 of the associated shaft and rotated, bevel gears (not shown) located in the lower housing of the bracket 14 will cause axial movement of a threaded shaft at the end of which Is formed with a spherical ball pivot. Thus, when the head 38 is rotated, the associated threaded shaft will move axially and cause adjustment of lamp body 12 about the horizontal aim axis A. On the other hand, when the head 40 of the adjustment mechanism 18 is rotated, the associated threaded shaft 42 will move axially and cause the lamp body 12 to be adjusted about the vertical aim axis B.

It will be noted that the ball pivot 44 associated with the adjustment mechanism 18 is connected to the bosses 34 and 36 by a two-piece plastic bearing member 46 comprising a pair of pivotally interconnected socket portions 48 and 50. As best seen in FIGS. 3 through 6, the socket portion 48 includes a body formed with a pair of mounting ears 52 and 54 each of which is provided with a bore 56 which receives a cap screw 58 for mounting the socket portion 48 to the bosses 34 and 36. The ears 52 and 54 are integrally formed with a conically shaped section 60 having a circular opening 62 formed therein for receiving the ball pivot 44. An extension 64 is integrally formed with the lower part of the section 60 and includes a centrally located concave semi-spherical bearing surface 66 formed with opposed arcuate grooves 68 for a pair of opposed lugs (not shown) integral with the ball pivot 44, and also formed with a C-shaped generally cylindrical pin retainer portion 70 which is located at one end of the extensIon 64. The other end of the extension 64 has an integrally formed enlargement 72 provided with a through bore 74 for threadably receiving a self-tapping cap screw 76.

The socket portion 50 includes a cylindrical pin 78 integrally formed with a body that also has a centrally located concave semi-spherical bearing surface 80 having opposed arcuate grooves 82 formed therein, as seen in FIG. 5, as alternate means for receiving the aforementioned lugs on ball pivot 44. The pin 78 has an enlarged generally conical split head 84 at one end thereof which is insertable into the retainer portion 70 of the socket member 48 for pivotally interconnecting the socket portion 50 as seen in FIGS. 3 and 4. The socket portion 50 also includes an enlargement 86 provided with a through bore 88 of a diameter greater than the diameter of the through bore 74 of the socket portion 48.

Thus as seen in FIG. 6, the socket portions 48 and 50 are two separate parts which can be interconnected to form the bearing member 46 for the ball pivot 44 by inserting the head 84 of the pin 78 into the retainer portion 70 of the socket portion 48. During insertion, the split head 84 contracts as it enters the retainer portion 70 and afterwards expands when located as seen in FIG. 4 to lock the two socket portions 48 and 50 together and provide a hinge-type connection about which the socket portion 50 can be pivoted outwardly to an open position relative to the body of the socket portion 48. In the open position, the ball pivot 44 can be seated on the bearing surface 66 with the lugs thereof in grooves 68 or grooves 82 after which the socket portion 50 is moved to the closed position of FIGS. 3 through 5 to trap the ball pivot 44. In order to securely maintain the ball pivot 44 between the bearing surfaces 66 and 80, the cap screw 76 passes through bore 88 and is threaded into the bore 74 as seen in FIG. 3.

As seen in FIGS. 1 and 2 the bearing member 90 incorporated with the adjustment mechanism associated with bracket 14 is identical to the bearing member 46 except that the hinge connection between the socket portions is located on the opposite side thereof. The bearing member 92 incorporated with the fixed ball pivot member 16 is a modified version of the bearing member 46. In this instance, the bearing member 92 is identical to the bearing member 46 and in addition includes a cylindrical boss 94 integrally formed with the extensIon member of the socket portion corresponding to socket portion 48. The boss 94 has a through bore which receives a shaft 96 the lower end of which is provided with a self-tapping thread that serves as a locking member for the bearing member 90. The upper end of the shaft 96 is received by the bore in the boss 94 and has a head 98 which can be rotated by a screwdriver or the like for threadably securing together the two socket portions of the bearing member 90.

It will be noted that the parts of bearing members 90 and 92 that correspond to the parts of bearing member 46 are identified by the same numerals but primed.

Thus, from the above description it should be apparent that if it is desired to remove the lamp body 12 from the lamp assembly 10 it is only necessary to unthread each of the screws associated with each of the bearing members. Inasmuch as the screw heads are located above the headlamp assembly 10, accessibility to the cap screws is facilitated for quick removal thereof. Conversely, the attachment of the lamp body 12 to the ball pivots can be accomplished readily by just reversing the procedure used for removing the lamp body 12.

Various changes and modifications can be made in this constructIon without departing from the spirit of the invention. Such changes and modifications are contemplated by the inventor and he does not wish to be limited except by the scope of the appended claims.

The embodiments of the invention in which an exclusive property or privilege is claimed are defined as follows:

1. The combination with a headlamp assembly adapted to be mounted to a support panel at the front end of a motor vehicle through a plurality of ball pivots each of which is formed with a shaft having a longitudinal axis that extends rearwardly for selective adjustable movement of the lamp body for aiming purposes, said lamp body including a reflector member the front end of which is closed by a lens, bearing means for connecting each of said ball pivots to the rear end of said reflector, at least one of said bearing members comprising a first socket portion secured to said reflector member and a second socket portion providing a spherical bearing surface for receiving one of said ball pivots, said first socket portion including means for securing said first socket portion to said reflector member, hinge means located along a horizontal axis that is substantially parallel to the longitudinal axis of the shaft associated with said one of said ball points for connecting said first socket portion to said second socket portion to permit said second socket portion to pivot upwardly about said hinge means, and fastener means movable axially along a vertical axis and accessible from above said headlamp for securing to and for facilitating the release of said first socket portion from said second socket portion to allow removal of the lamp body from the support panel.

2. The combination with a headlamp assembly adapted to be mounted to a support panel at the front end of a motor vehicle through a plurality of ball pivots each of which is formed with a shaft having a longitudinal axis that extends rearwardly for selective adjustable movement of the lamp body for aiming purposes, said lamp body including a reflector member the front end of which is closed by a lens, bearing means for connecting each of said ball pivots to the rear end of said reflector, at least one of said bearing members comprising a first socket portion and a second socket portion providing a spherical bearing surface for receiving one of said ball pivots, said first socket portion including a pair of laterally spaced ears for securing said first socket portion to said reflector member, hinge means in the form of a pin and cylindrical pin retainer located along a horizontal axis that is substantially parallel to the longitudinal axis of the shaft associated with said one of said ball points for connecting said first socket portion to said second socket portion to permit said second socket portion to pivot upwardly about said hinge means, and a screw means movable axially along a vertical axis and accessible from above said headlamp for securing to and for facilitating the release of said first socket portion from said second socket portion to allow removal of the lamp body from the support panel.

3. The combination with a headlamp assembly adapted to be mounted to a support panel at the front end of a motor vehicle through a plurality of ball pivots each of which is formed with a shaft having a longitudinal axis that extends rearwardly for selective adjustable movement of the lamp body for aiming purpose, said lamp body including a reflector member the front end of which is closed by a lens, bearing means for connecting each of said ball pivots to the rear end of said reflector, at least one of said bearing members comprising a first socket portion and a second socket portion providing a spherical bearing surface for receiving one of said ball pivots, said first socket portion including a pair of laterally spaced ears for securing said first socket portion to said reflector member, a pin located along a horizontal axis that is substantially parallel to the longitudinal axis of the shaft associated with said one of said ball points for connecting said first socket portion to said second socket portion to permit said second socket portion to pivot upwardly about said hinge means, and a screw means movable axially along a vertical axis and located to one side of said socket portions and accessible from above said headlamp for securing to and for facilitating the release of said first socket portion from said second socket portion to allow removal of the lamp body from the support panel.

4. The combInation of claim 3 wherein one of said socket portions includes a boss having a through bore for allowing a threaded shaft to be rotatably supported therein and provide the locking means for a second bearing member.

5. The combination of claim 3 wherein said pin has a split head insertable into a retainer portion formed in said second socket portion.

* * * * *